US012775182B1

(12) United States Patent
Dunn

(10) Patent No.: US 12,775,182 B1
(45) Date of Patent: *Oct. 27, 2026

(54) OPTICAL STACK WITH A LIQUID CRYSTAL LAYER AND A MICRO LENS ARRAY, ELECTRONIC DISPLAY ASSEMBLY, AND RELATED METHODS

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/321,779

(22) Filed: Sep. 8, 2025

Related U.S. Application Data

(63) Continuation of application No. 18/897,847, filed on Sep. 26, 2024, now Pat. No. 12,429,726.

(60) Provisional application No. 63/541,978, filed on Oct. 2, 2023.

(51) Int. Cl.

| | |
|---|---|
| ***F21V 8/00*** | (2006.01) |
| ***G02B 27/01*** | (2006.01) |
| ***G02F 1/1335*** | (2006.01) |
| ***G03F 7/20*** | (2006.01) |

(52) U.S. Cl.
CPC .. *G02F 1/133526* (2013.01); *G02F 1/133531* (2021.01); *G02F 1/133607* (2021.01)

(58) Field of Classification Search
CPC ......... G02F 1/133526; G02F 1/133607; G02F 1/133531
See application file for complete search history.

(56) References Cited

U.S. PATENT DOCUMENTS 11,644,610 B1 * 5/2023 Xu .................... G02F 1/133528
349/65
2021/0050385 A1 * 2/2021 Chuang ............... G02F 1/13318

* cited by examiner

*Primary Examiner* — Deeprose Subedi
(74) *Attorney, Agent, or Firm* — Standley Law Group LLP; Jeffrey S. Standley; Adam J. Smith

(57) ABSTRACT

An optical stack and related electronic display assemblies and methods are disclosed. The optical stack includes a substack with bonded components, including at least one polarizer, a liquid crystal layer, and a micro lens array. The optical stack further includes additional layers which are spaced apart from the substack, including at least one polarizer, and a light source.

20 Claims, 5 Drawing Sheets

OPTICAL STACK WITH A LIQUID CRYSTAL LAYER AND A MICRO LENS ARRAY, ELECTRONIC DISPLAY ASSEMBLY, AND RELATED METHODS

CROSS-REFERENCE TO RELATED APPLICATIONS

This application is a continuation of U.S. patent application Ser. No. 18/897,847 filed Sep. 26, 2024, which claims the benefit of U.S. provisional patent application Ser. No. 63/541,978 filed Oct. 2, 2023, the disclosures of which are hereby incorporated by reference as if fully restated herein.

TECHNICAL FIELD

Exemplary embodiments relate generally to an optical stack with a liquid crystal layer and a micro lens array, electronic display assemblies, and related methods.

BACKGROUND AND SUMMARY OF THE INVENTION

Micro lens arrays (MLAs) provide miniaturized lens which are sometimes used to focus light, such as may be emitted from an electronic display. The MLA may include a substrate with a large number of small lenses. The MLA may be placed atop an organic light emitting diode (OLED) type display, for example, to focus light emanating from the OLED display that may otherwise be scattered and/or turned into heat, for example.

Some electronic display assemblies utilize multiple layers which form part of, are placed in front of, and/or are positioned behind an electronic display or electronic display layer (e.g., layer of liquid crystals, sometimes referred to herein as a liquid crystal layer or "LC layer"). Together, these are sometimes referred to as an "optical stack". Examples of such components include backlights or other light sources (e.g., for the LC layer), diffusers, polarizers, adhesives (e.g., optically clear adhesives), covers (e.g., transparent or translucent layers), anti-reflective films, and the like. These layers may be provided in various combinations and/or arranged in various ways to provide certain benefits. Touch input layers or components may optionally be included in the optical stack or otherwise provided.

An optical stack with a liquid crystal layer and a micro lens array is provided, along with related electronic display assemblies and methods. In exemplary embodiments, without limitation, the optical stack includes a backlight, a diffuser forward of the backlight, a prism film forward of the diffuser, a first polarizer (e.g., reflective linear polarizer) forward of the prism film, a micro lens array (MLA) forward of the first polarizer, a second polarizer forward of the MLA, an electronic display layer (e.g., liquid crystal layer) forward of the second polarizer, and (optionally) a third polarizer forward of the electronic display layer. In exemplary embodiments, the second and third polarizers are directly bonded to the electronic display layer and/or the MLA is directly bonded to the second polarizer. Remaining layers may be spaced apart from one another.

Positioning of the MLA may cause light, which is typically somewhat scattered when exiting the prism film, to be at least somewhat focused before entering the second polarizer. This may, alternatively or additionally, capture and refocus light which is reflected by the polarizer rearward for a second attempt through the electronic display layer after being reflected forward again towards the electronic display layer. For example, a reflective surface(s) may be provided at a rear of the backlight or rearward thereof. This may result in increased image brightness and/or improved efficiency, among other advantages.

In other exemplary embodiments, without limitation, the MLA is instead positioned forward of the electronic display layer, which is a liquid crystal layer for a liquid crystal type display ("LCD"). The MLA may be bonded to the third polarizer. In this way, some portion of light which is ordinarily trapped/reflected at or within the film layers of the third polarizer, which is preferably optically bonded to a front of the LC layer, such as due to Total Internal Reflection ("TIR"), is instead emitted from the front of the LC layer due to the addition of the MLA. This may result in improved image quality, among other advantages. The MLA may be optically bonded to a front surface of the LC layer. Remaining layers may be spaced apart from one another.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
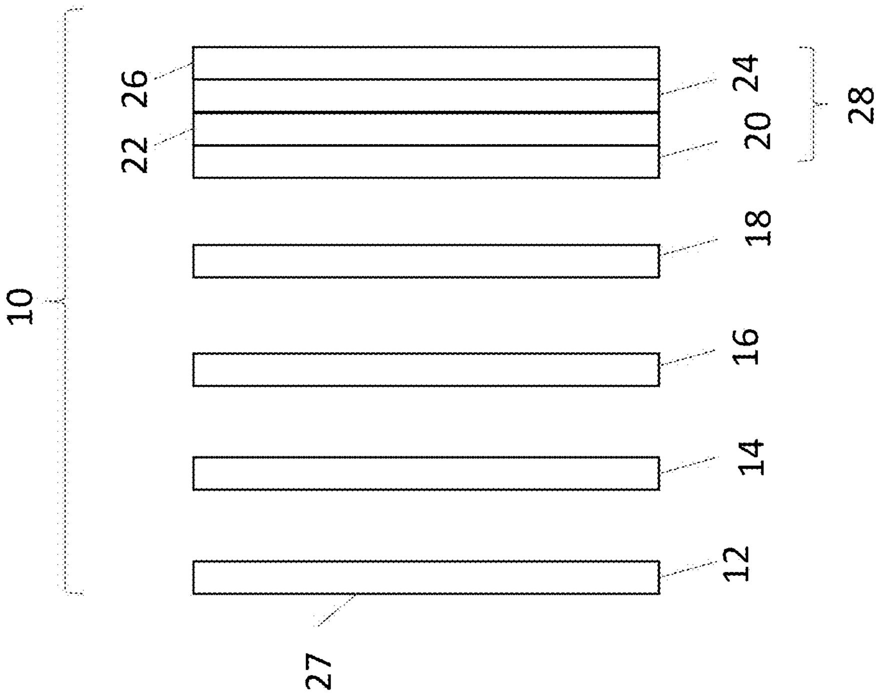
FIG. 1 is a side, sectional view of an exemplary optical stack in accordance with the present invention.

FIG. 1 illustrates an exemplary optical stack 10. In exemplary embodiments, without limitation, the optical stack 10 includes a light source 12. The light source 12 may be positioned at a rear portion of the optical stack 10. The light source 12 may comprise a backlight in exemplary embodiments, without limitation. For example, the light source 12 may comprise a number of light emitting diodes (LEDs) arranged to provide direct backlighting to a permissive type electronic display layer 24 (e.g., liquid crystal layer), by way of non-limiting example. More specifically, without limitation, the light source 12 may comprise a printed circuit board ("PCB") or other substrate, each with one or more LEDs provided thereon. A reflective surface 27, side(s), and/or other portion of the light source 12 may comprise reflective material.

Alternatively, or additionally, the light source 12 may comprise edge lighting for the electronic display layer 24. For example, the light source 12 may comprise a number of light emitting diodes (LEDs), such as arranged at one or more substrates, around one or more perimeter edges of a diffuser 14, preferably located rearward of the electronic display layer 24. In such embodiments, the reflective surface 27 may be provided at a rear surface of the diffuser 14 or at a separate layer behind the diffuser 14.

The optical stack 10 may include the diffuser 14, which may be positioned forward of the light source 12 (and/or reflective surface(s) 27).

A prism film 16 may be positioned forward of the diffuser 14.

A first polarizer 18 may be positioned forward of the prism film 16. The first polarizer 18 in exemplary embodiments, without limitation, comprises a reflective linear polarizer. The first polarizer 18 may comprise a dual brightness enhancement film ("DBEF"), such as available from 3M™ of St. Paul, Minnesota (https://www.3 m.com/3M/en_US/p/d/b5005047085/) by way of non-limiting example.

The optical stack 10 may comprise an MLA 20. The MLA 20 may be positioned forward of the first polarizer 18. The MLA may be positioned rearward of a second polarizer 22. In exemplary embodiments, without limitation, the MLA 20 is directly adjacent to a rear surface of the second polarizer 22. For example, without limitation, the MLA 20 is bonded to the rear surface of the second polarizer 22 by way of an optically clear adhesive.

The electronic display layer 24 may be positioned forward of the second polarizer 22. A rear surface of the electronic display layer 24 may be directly bonded to a forward surface of the second polarizer 22. The electronic display layer 24 may comprise a permissive type display layer, such as but not limited to a liquid crystal layer (LC layer). In this fashion, the optical stack 10 may be part of a liquid crystal type display (LCD) and/or display subassembly.

Optionally, a third polarizer 26 may be provided forward of the electronic display layer 24. For example, the third polarizer 26 may be directly bonded to a front surface of the electronic display layer 24.

The MLA 20, second polarizer 22, electronic display layer 24, and (optionally) the third polarizer 26 may form a sub-stack 28. The sub-stack 28 may comprise, or consist of, directly or indirectly bonded components.

The second and/or third polarizers 22, 26 may comprise circular polarizers, linear polarizers, quarter wave retarders, combinations thereof, or the like. The third polarizer 26 may optionally be placed rearward of the electronic display layer 24.

Figure 2:
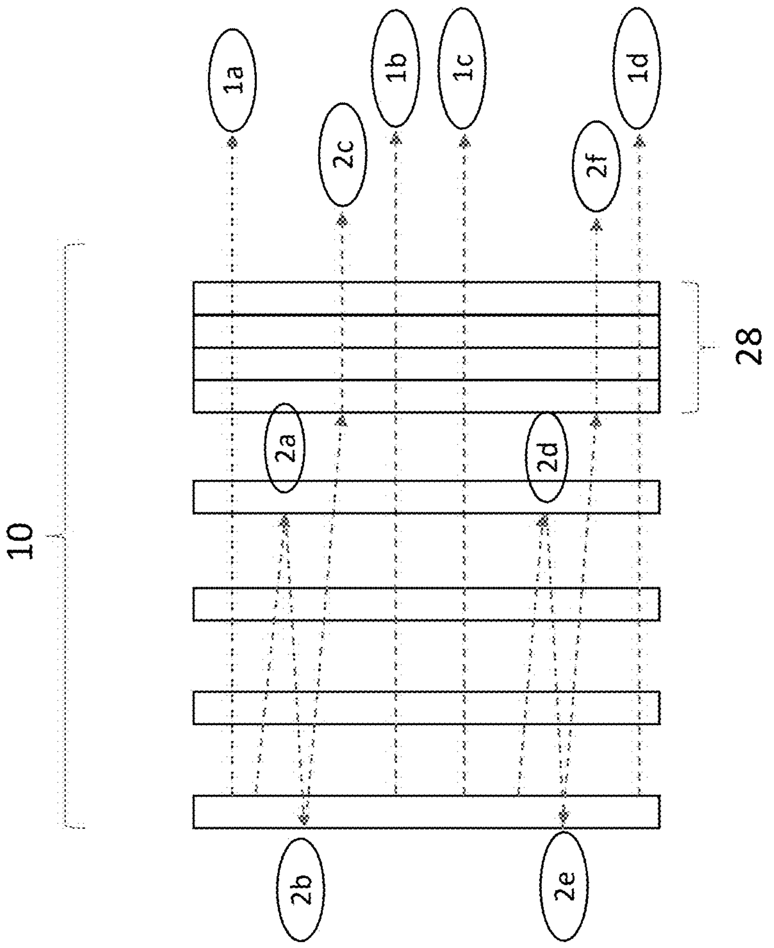
FIG. 2 illustrates exemplary light travel through the optical stack of FIG. 1.

As illustrated with particular regard to FIG. 2, light exiting the light source 12 may travel through the diffuser 14, which may relatively scatter and/or homogenize the light. The light may further travel through the prism film 16, which may collimate the light in a direction, such as but not limited to vertical or horizontal. The light may further travel through the first polarizer 18, some of which may be reflected and/or absorbed, and other portions of which may be passed through. Some of the light (e.g., illustrated rays 1*a*-1*d*) may be properly oriented for acceptance by the first polarizer 18 for travel through the electronic display layer 24. Other portions of the light (e.g., illustrated rays 2*a*, 2*d*) may not be properly oriented and be reflected or obstructed by the first polarizer 18 and may preferably travel rearward (e.g., with reflective type polarizer, illustrated rays 2*b*, 2*e*), such as through certain layers of the optical stack 10 before being reflected forward again, such as by the reflective surface(s) 27 through at least certain layers of the optical stack 10 (e.g., illustrated rays 2*c*, 2*f*). At least some of the light may further travel through the MLA 20 for relative focusing before entering the second polarizer 22 and/or sub-stack 28. At least some of the reflected portions of light may be accepted and others may be further recycled, such as until being transformed into another form (e.g., heat). In this fashion, the light may be recycled through the optical stack 10 for multiple attempts to enter the electronic display layer 24 and/or sub-stack 28. This may result in increased image brightness and/or improved efficiency, among other advantages.

Figure 3:
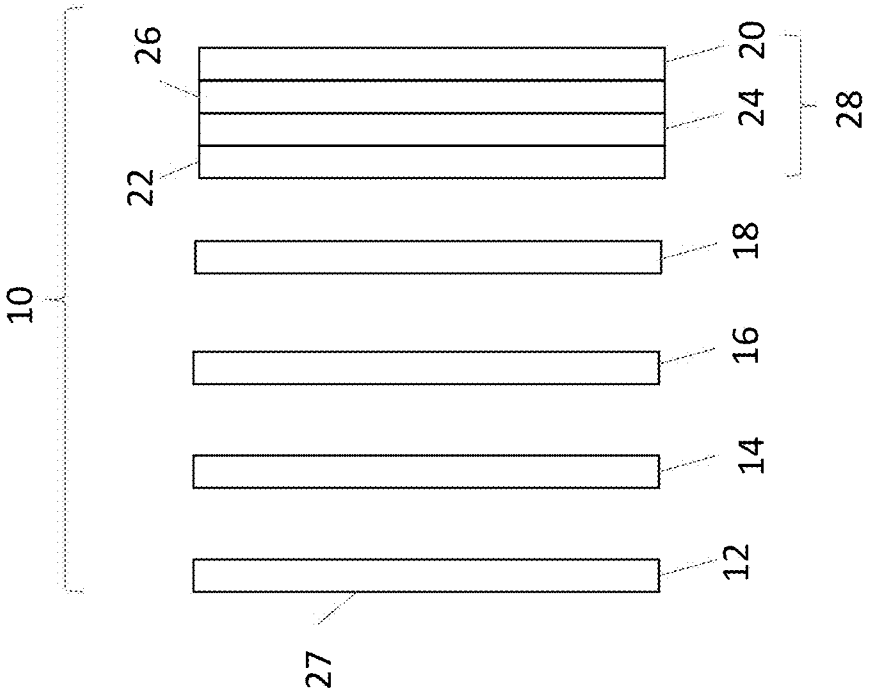
FIG. 3 is a side, sectional view of another exemplary optical stack in accordance with the present invention.

As illustrated in FIG. 3, the MLA 20 may, alternatively, or additionally, be positioned forward of the electronic display layer 22 (e.g., liquid crystal layer), such as at a forward surface of the third polarizer 26 by way of non-limiting example. In exemplary embodiments, the MLA 20 is optically bonded to the third polarizer 26. Some portion of light which is ordinarily trapped/reflected at or within the film layers of the third polarizer 26, such as due to TIR, is instead emitted from a front of the electronic display layer 24, due, at least in part, to the addition of the MLA 20.

The second polarizer 22, electronic display layer 24, MLA 20, and the third polarizer 26 may form a sub-stack 28.

In other exemplary embodiments, without limitation, the MLA 20 is positioned at the front of the electronic display layer 24, such as by optical bonding, such as where a third polarizer 26 is not used.

Figure 4:
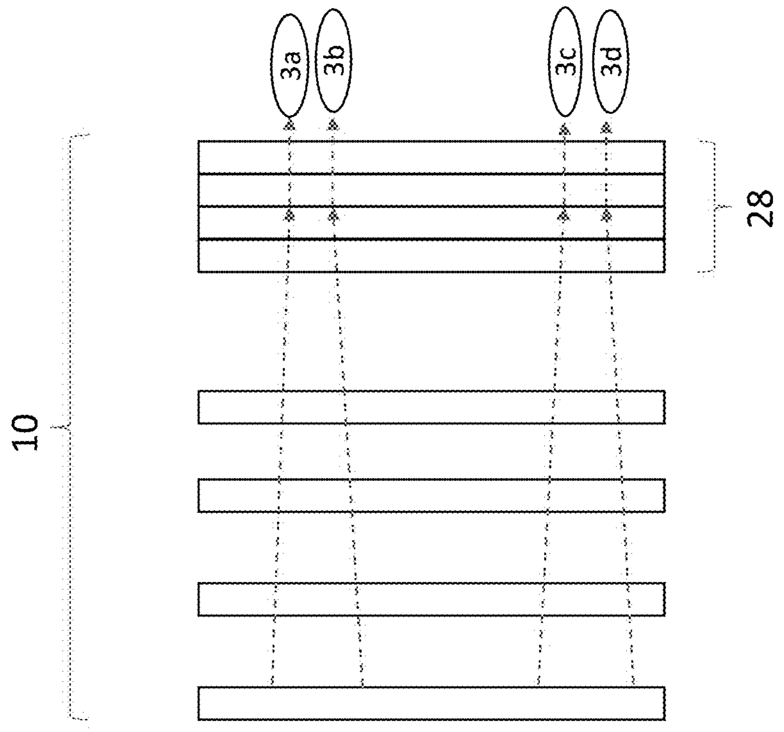
FIG. 4 illustrates exemplary light travel through the optical stack of FIG. 3.

As illustrated in FIG. 4, in this way light (e.g., illustrated rays 3*a*-3*d*) which is typically somewhat scattered when exiting the electronic display layer 22 (e.g., at an accepted off-angle) may be at least relatively focused. Other portions of the light may proceed the same or similarly as described with regard to FIG. 2 (e.g., reflecting or accepted by first polarizer 18). This may result in improved image quality, among other advantages.

Figure 6:
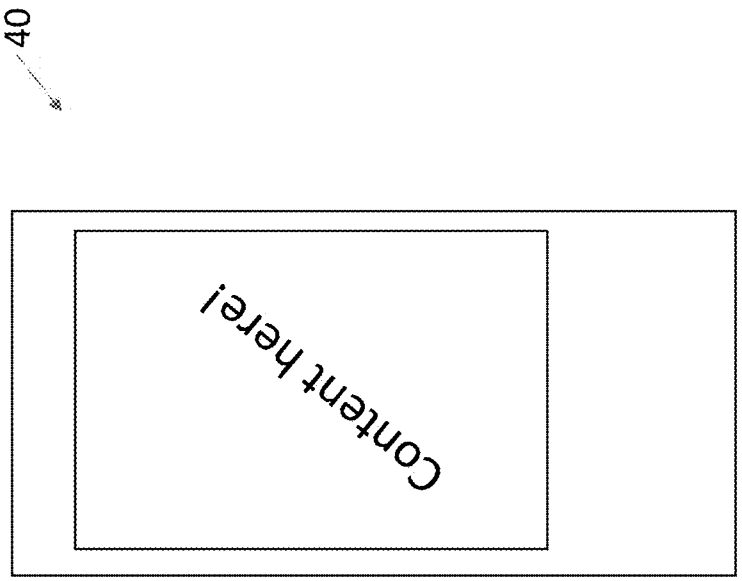
FIG. 6 is a front view of the electronic display assembly of FIG. 5.
Figure 5:
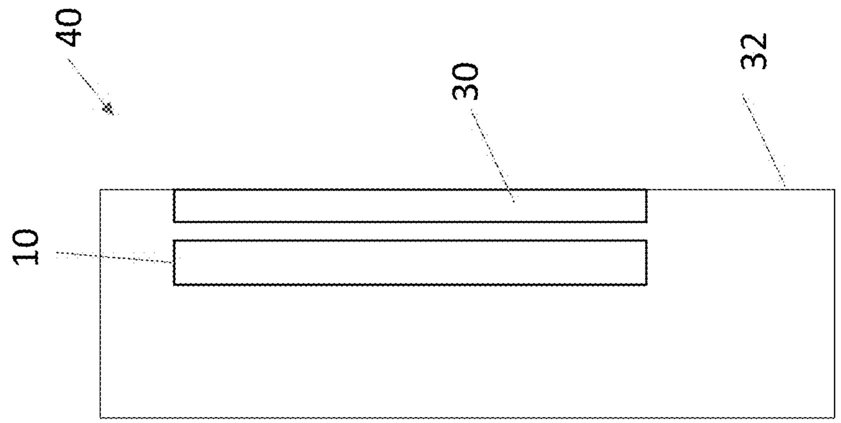
FIG. 5 is a side sectional view of an exemplary electronic display assembly with the optical stack of any of FIGS. 1-4.

FIG. 5 and FIG. 6 illustrates the optical stack 10 in an exemplary electronic display assembly 40. The electronic display assembly 40 may include the optical stack 10 rearward of one or more cover layers 30. The cover layer(s) 30 may be considered part of, or separate from, the optical stack 10. The optical stack 10 may be directly connected (e.g., bonded) to the cover layer(s) 30, or may be spaced apart therefrom, such as to accommodate airflow and/or provide particular lighting/reflectance arrangements. A housing 32 may further enclose the optical stack 10. One or more thermal management devices (e.g., airflow pathways, fans, heaters, air conditioners, filters, heat exchangers, combinations thereof, or the like), network connectivity components, cameras, sensors, way finding equipment, telecommunications equipment, computing equipment, combinations thereof, or the like may be provided at the electronic display assembly 40, such as at least partially within the housing 32. Images displayed at the electronic display layer 22 may be visible through the cover layer(s) 30, such as to a viewer. The electronic display assembly 40 may be configured for indoor, semi-outdoor, and/or outdoor use. Structural framework members or other components may be provided for installing the electronic display assembly 40 at a sidewalk, parking lot, wall, post, item of street furniture, ground surface, combinations thereof, or the like.

The optical stack 10, with or without the cover layer(s) 30, may form an electronic display or display subassembly, such as for the electronic display assembly 40. The size, shape, spacing, orientation, and the like of the optical stack 10, electronic display assembly 40, and/or various components thereof is merely exemplary and not intended to be limiting. Various sizes, shapes, spacings, orientations, and the like of the optical stack 10, electronic display assembly 40, and/or various components thereof may be utilized. For example, the illustrated layers are relatively small so that they may be viewed in their entirety, and the illustrated spacing is relatively exaggerated so that the individual layers may be more clearly distinguished. In practice, the layers may be much closer together and larger in size, by way of non-limiting example.

The electronic display assembly 40 may comprise multiple electronic displays and/or electronic display subassemblies (e.g., optical stacks 10 and/or cover layers 30), which may face in same or different directions, be provided in same or different sizes, shapes, orientations, combinations thereof, or the like. The electronic display(s) or display subassembly (ies) may be movably attached to a structural framework, such as for rotating outward therefrom to service internal components.

The layers of the optical stack 10 and/or cover layer 30 may extend substantially parallel to one another (e.g., within commercially reasonable manufacturing tolerances, within +/−20 degrees, and/or within 5 degrees, without limitation). The layers of the optical stack 10 and/or cover layer 30 may, alternatively or additionally, be substantially coextensive in size (e.g., within commercially reasonable manufacturing tolerances, within 20% relative surface area, and/or within 5%, without limitation).

The optical stack 10 may be manufactured, at least in part, by successively providing the various layers, preferably including optically bonding the MLA 20 to a rear surface of the second polarizer 22, forward surface of the electronic display layer 22, and/or forward surface of the third polarizer 26. The electronic display assembly 40 may be manufactured, at least in part, by providing, mounting, and/or securing the optical stack 10 within a housing 32, such as rearward of a cover layer 30. The electronic display assembly 40 may be operated by displaying images at an electronic display comprising the optical stack 10.

Some or all of the foregoing may be performed by one or more pieces of computerized manufacturing equipment. Inspection may be performed at or between various steps, such as by way of machine vision equipment.

Touch input layers or components may optionally be included in the optical stack 10 or otherwise provided, such as part of the electronic display assembly 40.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. An optical stack for an electronic display assembly, said optical stack comprising:

a substack comprising components bonded to one another by one or more optically clear adhesives, said substack comprising:

at least one polarizer;

a liquid crystal layer ("LC layer"); and a micro lens array ("MLA"); and additional layers spaced apart from the substack with a non-bonded interface therebetween, said additional layers comprising:

at least one reflective polarizer positioned to reflect light towards the MLA; and a backlight comprising a plurality of light emitting diodes ("LEDs") arranged rearward of, and facing, the LC layer such that, when activated, the LEDs backlight the LC layer.

2. The optical stack of claim 1 wherein:

each of the additional layers are spaced apart from one another with non-bonded interfaces.

3. The optical stack of claim 1 wherein:

the additional layers comprise a diffuser.

4. The optical stack of claim 1 wherein:

the additional layers comprise a prism film.

5. The optical stack of claim 1 wherein:

the additional layers comprise a diffuser and a prism film, the diffuser being located rearward of the prism film.

6. The optical stack of claim 1 wherein:

the at least one polarizer of the substack comprises a first polarizer and a second polarizer.

7. The optical stack of claim 6 wherein:

the first polarizer and the second polarizer sandwich the LC layer such that the first polarizer is positioned forward of the LC layer and the second polarizer is positioned rearward of the LC layer.

8. The optical stack of claim 7 wherein:

the MLA is forward of the first polarizer.

9. The optical stack of claim 7 wherein:

the MLA is rearward of the second polarizer.

10. The optical stack of claim 1 wherein:

the MLA is a forward most layer of the substack.

11. The optical stack of claim 1 wherein:

the MLA is a rear most layer of the substack.

12. An electronic display assembly comprising:

the optical stack of claim 1.

13. The electronic display assembly of claim 12 further comprising:

a housing; and a cover which is transparent or translucent, wherein the cover forms a forward portion of the housing and the optical stack and the additional layers are located interior to said housing such that images generated at the optical stack are visible through the cover to a viewer external to the display assembly.

14. The electronic display assembly of claim 13 wherein:

the cover comprises multiple layers of a transparent or translucent material bonded with the one or more optically clear adhesives.

15. The optical stack of claim 1 further comprising:

a touch input layer forming part of the optical stack and bonded to a component of the substack by said one or more optically clear adhesives.

16. The optical stack of claim 1 wherein:

the reflective polarizer comprises a dual brightness enhancement film.

17. An optical stack for an electronic display assembly, said optical stack comprising:

a substack comprising adjacent components bonded to one another by one or more optically clear adhesives, said substack comprising:

a first polarizer;

a liquid crystal layer ("LC layer") rearward of the first polarizer;

a second polarizer located rearward of the LC layer; and a micro lens array ("MLA") located rearward of the second polarizer; and additional layers spaced apart from one another and from the substack with a non-bonded interface therebetween, said additional layers comprising:

a reflective polarizer located rearward of the substack for reflecting light towards the MLA;

a prism film located rearward of the third polarizer;

a diffuser located rearward of the prism film; and a backlight comprising light emitting diodes ("LEDs") arranged rearward of, and facing, the LC layer and the diffuser such that, when activated, the LEDs provide backlighting for the LC layer through the diffuser.

18. The optical stack of claim 17 further comprising:

a touch input layer forming part of the optical stack and bonded to a component of the substack by said one or more optically clear adhesives.

19. An electronic display assembly, comprising:

an optical stack comprising:

a substack comprising adjacent components bonded to one another by one or more optically clear adhesives, said substack comprising:

a first polarizer;

a liquid crystal layer ("LC layer") rearward of the first polarizer;

a second polarizer located rearward of the LC layer; and a micro lens array ("MLA") located forward of the first polarizer; and additional layers spaced apart from one another and from the substack by a non-bonded interface therebetween, said additional layers comprising:

a reflective polarizer located rearward of the substack for reflecting light towards the MLA;

a prism film located rearward of the reflective polarizer;

a diffuser located rearward of the prism film; and a backlight comprising light emitting diodes ("LEDs") arranged rearward of, and facing, the LC layer such that, when activated, the LEDs provide backlighting for the LC layer through the diffuser;

a housing; and a cover which is transparent or translucent, wherein the cover forms a forward portion of the housing and the optical stack and the additional layers are located interior to said housing such that images generated at the optical stack are visible through the cover to a viewer external to the display assembly.

20. The display assembly of claim 19 further comprising:

a touch input layer forming part of the optical stack and bonded to a component of the substack by said one or more optically clear adhesives.

* * * * *